(12) United States Patent
Mouws et al.

(10) Patent No.: US 10,386,616 B2
(45) Date of Patent: Aug. 20, 2019

(54) METHOD OF FABRICATING A WAFER LEVEL OPTICAL LENS ASSEMBLY

(71) Applicant: Anteryon Wafer Optics B.V., Eindhoven (NL)

(72) Inventors: Antonius Adrianus Maria Mouws, Wintelre (NL); Edwin Maria Wolterink, Valkenswaard (NL); Koen Gerard Demeyer, Genk (BE)

(73) Assignee: Anteryon Wafer Optics B.V., Eindhoven (NL)

( * ) Notice: Subject to any disclaimer, the term of this patent is extended or adjusted under 35 U.S.C. 154(b) by 248 days.

(21) Appl. No.: 15/112,338

(22) PCT Filed: Feb. 11, 2015

(86) PCT No.: PCT/NL2015/050091
§ 371 (c)(1),
(2) Date: Jul. 18, 2016

(87) PCT Pub. No.: WO2015/122769
PCT Pub. Date: Aug. 20, 2015

(65) Prior Publication Data
US 2016/0356995 A1    Dec. 8, 2016

Related U.S. Application Data

(60) Provisional application No. 61/939,366, filed on Feb. 13, 2014.

(30) Foreign Application Priority Data

Feb. 13, 2014    (NL) ...................................... 2012262

(51) Int. Cl.
G02B 7/02    (2006.01)
G02B 13/00    (2006.01)
(Continued)

(52) U.S. Cl.
CPC .... G02B 13/0085 (2013.01); B29D 11/00307 (2013.01); B29D 11/00442 (2013.01);
(Continued)

(58) Field of Classification Search
CPC .... G02B 13/0085; G02B 5/003; G02B 1/041; G02B 3/0031; G02B 7/021; G02B 3/0062;
(Continued)

(56) References Cited

U.S. PATENT DOCUMENTS 3,532,038 A    10/1970    Rottmann
2004/0100700 A1    5/2004    Kitamura et al.
(Continued)

FOREIGN PATENT DOCUMENTS

WO    2003069740 A2    8/2003
WO    2004027880 A2    4/2004
(Continued)

OTHER PUBLICATIONS

International Search Report and Written Opinion dated Oct. 26, 2012.

*Primary Examiner* — Alicia M Harrington
(74) *Attorney, Agent, or Firm* — Wood, Phillips, Katz, Clark & Mortimer (57) ABSTRACT

The present invention relates to method of fabricating a wafer level optical lens assembly. The method includes providing a wafer substrate having a plurality of lens shapes arranged side by side, and providing a spacer substrate having a plurality of spacer posts. The method further includes applying a first polymer liquid on a specific location chosen from the group of: (1) positions located on the wafer substrate between the plurality of lens shapes; (2) positions located on the contact surface of the spacer posts; and (3) a combination thereof. The method further includes
(Continued)

contacting the wafer substrate with the spacer substrate such that the spacer posts force the first polymer liquid to flow towards the lens shapes, followed by curing the first polymer liquid, and applying a second polymer liquid onto the lens shapes.

20 Claims, 8 Drawing Sheets

(51) Int. Cl.
  *B29D 11/00* (2006.01)
  *G02B 1/04* (2006.01)
  *G02B 5/00* (2006.01)
  *G02B 3/00* (2006.01)
  *B29K 105/00* (2006.01)

(52) U.S. Cl.
  CPC ............ *G02B 1/041* (2013.01); *G02B 5/003* (2013.01); *G02B 7/02* (2013.01); *B29K 2105/0032* (2013.01); *G02B 3/0031* (2013.01)

(58) Field of Classification Search
  CPC ........ B29D 11/00442; B29D 11/00307; B29K 2105/0032; H04N 5/2254; H04N 5/2257; H04N 5/2258

See application file for complete search history.

(56) References Cited

U.S. PATENT DOCUMENTS

| | | |
|---|---|---|
| 2009/0022949 A1 | 1/2009 | Horita et al. |
| 2011/0043923 A1 | 2/2011 | Rossi et al. |
| 2011/0096213 A1 | 4/2011 | Hasegawa |
| 2011/0211105 A1 | 9/2011 | Yamada et al. |
| 2011/0222171 A1 | 9/2011 | Kintz et al. |
| 2013/0003199 A1 | 1/2013 | Jeong et al. |
| 2015/0168666 A1* | 6/2015 | Brouwer ............ B32B 37/0084 359/811 |

FOREIGN PATENT DOCUMENTS

| | | |
|---|---|---|
| WO | 2010050290 A1 | 5/2010 |
| WO | 2012100356 A1 | 8/2012 |

* cited by examiner

METHOD OF FABRICATING A WAFER LEVEL OPTICAL LENS ASSEMBLY

CROSS-REFERENCE TO RELATED APPLICATIONS

This application claims priority of Provisional Ser. No. 61/939,366, filed Feb. 11, 2015, and Appln. No. PCT/NL2015/050091, filed Feb. 11, 2015, the disclosures of which are hereby incorporated by reference in their entirety.

FIELD OF THE INVENTION

The present invention relates to a method of fabricating a wafer level optical lens substrate. In addition, the present invention relates to lenses obtained according to such a method, especially wafer level optical integral lens supports and to devices incorporating such lenses. More in detail, the present invention relates to a method of fabricating full polymer lenses with integrated light blocking side walls.

BACKGROUND OF THE INVENTION

Compact camera modules have become a standard component in mobile devices such as mobile phones, tablets, hand held game computers, and note books. A camera module consists of PCB board, an imaging sensor module and a lens module. The lens module consists of a lens assembly and a housing shielding it from unwanted light and environmental influences. The housing may also be shared with the housing of the complete camera module. The outer contours of a compact camera module are in many cases designed as drop-in component into mobile devices. Lens modules can also be incorporated into an illumination module, which illumination module further comprises a light source, such as a LED. Wafer level optical lens modules are consequently utilized in camera modules of cellular phones, for example.

The mass volume requirements together with the increasing drive for reducing costs triggered the development of wafer level based methods for producing and packaging the camera modules and related image sensor and optics.

The aim of packaging is to integrate the several optical, mechanical, environmental and electronic functions of a compact camera module and a lens module. For this purpose, size reduction in all directions is an important issue. This includes reduction in height (shortening van the optical path of the lens module) and in reduction of the foot print and the pitch of the components on a wafer. For instance, elimination of glass substrates contributes to lower height and costs. Foot print reduction is realized through wafer level integration light transmitting optical structures with light blocking structures such as partition walls and housings. The need for integrating partition walls originates from the fast growing market of array camera's and optical sensors.

The functional elements consist of an optical active element such as LED or VCSEL light source or a CMOS or CCD image capturing device, the imaging lenses together with optical functions such as IR filters, AR coats and light blocking structures such as baffles etc. In most cases, micro lenses and color filters are positioned on the image sensor surface.

The lens elements are usually formed by injection moulding or glass pressing. Integrated lens stacks relating to lens assemblies based on wafer level manufacturing have been disclosed in WO2004/027880. In this process, lens elements, spacers and other optical functions are manufactured at the wafer level. After singulation (i.e. separation of the wafer into individual modules) integrated lens modules are obtained.

Wafer level manufacturing of opto-electronic components in general assumes a wafer to wafer assembly of the optics wafer with the image sensor wafer. The aim is to reduce costs through maximizing the simultaneous processing of components followed by a singulation, usually dicing step. This assumption is based on the very high yields using state-of-art manufacturing front end processes for electronic components on silicon wafers. These processes benefit from a decades track record of process development using silicon as a substrate. However, the processes for manufacturing optical components on wafer level are based on different materials (glass, polymer) and processes (injection moulding, UV, thermal replication, glass pressing). In addition, refractive optical structures require extreme, i.e. high, shape accuracies with comparably high aspect ratios. So, in many cases, the yield involving manufacturing of optics on wafer level is lower than may be obtainable for electronic components. As a result an image sensor module wafer with good yield may be assembled on an optical wafer with a lower yield.

US 2013/003199 relates to a method of manufacturing a lens unit, the method comprising: preparing a preliminary lens array substrate including an opening for exposing a lens region where a lens part is formed; placing the preliminary lens array substrate at an inside of a mold; forming the lens part in the opening by injecting a resin material into the inside of the mold such that the opening is filled with the resin material and curing the resin material; and cutting the preliminary lens array substrate. The first lens unit includes a first lens part and a first support part, wherein the first lens part has a curved region having a predetermined curvature and a flat region extending in the lateral direction from the curved region. A first support part is disposed around the first lens part and the first support part has a hole in which the first lens part is installed such that the first lens part can be attached to a lateral side of the hole wherein a lateral side of the first lens part may adhere to the inner wall of the hole, especially the lateral side of the first lens part may be integrally formed with the inner wall of the hole.

US 2011/211105 relates to a lens array, comprising: a substrate in which a plurality of through holes are formed; and a plurality of lenses provided in the substrate by burying the plurality of through holes, wherein a part of the through hole is different in at least one of sectional shape and opening area of the through hole, which are taken in parallel with a surface of the substrate, from another part of the through hole in a depth direction.

US 2011/222171 relates to a method of forming an optics block, comprising: providing a substrate having first and second opposing surfaces, the substrate being a first material and having a plurality of through holes extending in the substrate between the first and second opposing surfaces; providing a second material, different than the first material, filling a portion of the through holes and extending on a portion of the first surface of the substrate outside the through holes; and replicating a first lens structure in the second material and corresponding to each of the through holes.

WO2010/050290 relates to a wafer lens manufacturing method for manufacturing a wafer lens provided with convex lens portions on a glass substrate by curing resin between a glass substrate and a resin mold in which concave cavities are formed.

US 2011/096213 relates to method for manufacturing a wafer-shaped optical apparatus with a base material substrate as a framework and a resin optical element section being molded at a hole of the base material substrate, the method comprising: a hole forming step of forming one or a plurality of holes in the base material substrate; a pressing step of putting an optical element resin and the base material substrate between optical element lower and upper metal molds formed to correspond to the hole, to mold at least the optical element section; and a resin curing step of curing the resin using heat or light. In addition this US2011096213 provides a lens module including a glass substrate as a base material (framework) with a plurality of holes formed therein, a resin lens formed to correspond to each of the plurality of holes, and a peripheral resin section made with the same resin material as the resin lens and formed on upper and lower surfaces of the glass substrate in the periphery of the resin lens. The present inventors are of the opinion that no light leakage through the bottom side is allowed when mounting the optical component on a device (e.g. LED emitter). Transparent materials and/or bubbles can cause light leakage. In addition trapped air bubbles cause poor adhesion and delamination resulting from pop corning during heat treatment. Thus light blocking must be guaranteed over the entire wall below the bottom lens surface.

US 2011/222173 relates to a method of fabricating a wafer level optical lens substrate, comprising: providing a substrate; forming at least one through hole on the substrate and forming a flange on a side wall in each through hole; and forming a lens on the flange in each through hole and embedding the lens with the flange.

US 2009/022949 relates to a process for producing a functional-element-mounted module, comprising the steps of disposing a substrate having mounted thereon a functional element having a mounting portion and a resin sealing plate formed therein with an opening corresponding in position to the functional portion of the functional element as opposed to each other at a predetermined distance; and impregnating and filling a sealing resin between the substrate and the resin sealing plate utilizing a capillary phenomenon.

In addition, when assembling a lens module upon the image sensor module, the distance between the bottom optical surface of the lens module and the image plane has to be very accurately controlled. This can be performed through active alignment assembly methods, wherein the image is projected on an image sensor and the quality of the resulting focal position is measured. According to the result, the lens module is vertically displaced to a position where an optimal image quality is obtained. The whole procedure of measuring and adjusting is time consuming and requires expensive assembly with in line focus length measurement.

From U.S. Pat. No. 3,532,038 there is known an optical system in which a transparent base member is provided with lenticular lens cavities, which cavities are filled with a refractive fluid, the surface of which fluid is covered with a cover member. The cover member is provided with an aperture plate, on which finally a second base member is present, which is also provided with lenticular lens cavities, which cavities are likewise filled with a refractive fluid.

From US 2004/0100700 there is known a method of manufacturing a micro lens array, wherein the cavities in a mould are filled with a UV curable resin, whilst the resin outside the cavities is removed by placing a transparent quartz board on top of the mould. The fluid present in the cavities is then formed into a plurality of separate lenses, whereupon a second UV curable resin layer is applied to the transparent board, which resin layer is cured by making use of the already formed separate lenses. The excess amount of the cured second resin layer is removed by using an organic solvent. Only one layer of replicated lenses is mentioned in the document, which lenses are separately arranged and do not exhibit any interconnection.

From International application WO 03/069740 in the name of the present inventor there is also known a replication process by which an optical element is formed.

WO2012/100356 relates to a method for manufacturing a plurality of optical devices, comprising the steps of: providing a replication tool, the replication tool comprising a replication surface defining an array of replication cells, each replication cell comprising a lens replication portion and a spacer replication portion, bringing the replication tool and a support in contact with each other with replication material between the replication surface and the support; causing the replication material to harden, wherein, during the step of causing the replication material to harden, the lens replication sections are caused to be kept at a distance from the support.

From the above state of the art there are thus known methods by which optical systems are obtained which are made up of separately manufactured optical elements, as a result of which the dimensions of such systems may be considered to be large. In addition, the positional accuracy, viz. in the X, Y and Z directions (between the lens surfaces) of such systems may be called critical.

The method of replicating of lenses within the apertures of a spacer wafer has an effect on the height, but still requires a tight tolerance of the stiff substrate used. In addition, the control of the shape of the lenses is somewhat difficult, especially the risk of the formation of bubbles, and/or a multistage process is required, comprising steps of, inter alia, filling holes with polymer, curing thereof, flattening of filled spacer wafer and replicating lenses on the filled holes.

Thus it is an object of the present invention to provide a method for manufacturing an optical unit in which the desired dimensional precision of the lens system can be achieved without the dimensions of the optical unit increasing undesirably.

Another object of the present invention is to provide a lens assembly, in which well defined lens shapes are present.

Thus it is an object of the present invention to provide a method for manufacturing full polymer lenses with integrated light blocking side walls.

SUMMARY OF THE INVENTION

The method according to the present invention relates to a method of fabricating a wafer level optical lens assembly, comprising:

providing a wafer substrate having a plurality of lens shapes arranged side by side;

providing a spacer substrate having a plurality of spacer posts;

applying a first polymer liquid on a specific location chosen from the group of positions located on the wafer substrate between the plurality of lens shapes and positions located on the contact surface of the spacer posts, or a combination thereof;

contacting the wafer substrate with the spacer substrate such that the spacer posts force the first polymer liquid to flow towards the plurality of lens shapes arranged side by side;

curing the first polymer liquid;

applying a second polymer liquid onto the plurality of lens shapes of the wafer substrate;

curing the second polymer liquid to form a lens.

The present method enables the manufacturing of full polymer lenses with integrated light blocking side walls. The present inventors found that for ensuring an air bubble free layer of first liquid polymer it is preferred to obtain a full coating of at least the contact surface of spacer posts present on a spacer substrate. The first polymer liquid should not preferably coat the optical surface of the lens shapes. The space along the sides of the spacer posts act as an overflow zone. The distribution of the first polymer liquid is mainly driven by capillary forces since the area between the contact surface of the spacer posts and the wafer substrate is small. Thus, the driving force that causes filling of the smallest gaps or slits between the contact surface of the spacer posts and the wafer substrate is capillary action.

According to the present method the first polymer liquid can be applied on the free surface of the wafer substrate only, i.e. on the locations between the plurality of lens shapes. According to another embodiment it is also possible to apply the first polymer liquid on the contact surface of the spacer posts only. It is also possible to apply first polymer liquid on both the locations between the plurality of lens shapes and on the contact surface of the spacer posts. The function of the first polymer liquid is to wet the contact surface of the spacer posts, i.e. to provide, i.e. to surround or embed the outer ends or end parts of the spacer posts with first polymer liquid. It is preferred that the first polymer has a light-shielding or a light-absorbing function, for example with the aid of special fillers, pigments and dyes. The specific location of the first polymer liquid around the outer ends or end parts of the spacer posts thus prevents surrounding light from entering the light path of the rays through the final lens structure. In addition the amount of first polymer liquid is chosen such that the volume between the lens shapes located on the wafer substrate and the outer ends or end parts of the spacer posts is filled with first polymer liquid, without covering the lens shapes itself. More in detail, only the outer edges of the lens shapes are in contact with the first polymer liquid.

The spacer substrate is designed such that the position of the spacer posts match with the locations on the wafer substrate between the lens shapes. In other words, the spacer posts are in alignment with the locations on the wafer substrate between the lens shapes.

The step of contacting the wafer substrate with the spacer substrate is carried out such that the spacer posts of the spacer substrate force the first polymer liquid to flow towards the plurality of lens shapes arranged side by side. The final distance between the wafer substrate and the spacer substrate at the end of the contacting step is such that the first polymer liquid is still present in a small area, which is a slit, filled with first polymer liquid.

The afore-mentioned wafer can have a circular shape, but rectangular or square type wafers can be used as well. The lens shapes can be regularly spaced on the wafer substrate, in an equidistant space, but the lens shapes can be placed randomly on the wafer substrate as well. In addition the shape and/or the dimension of the lens shapes are not restricted to a particular shape or size.

According to a preferred embodiment the present method further comprises applying a third polymer liquid onto the already cured second polymer liquid and curing the third polymer liquid.

It is furthermore preferred to level or flatten the third polymer liquid before curing the third polymer liquid.

Since the third polymer thus cured posses a flat and even surface it is possible to replicate a plurality of lenses on the surface of the already cured third polymer liquid.

According to a preferred embodiment the present method further comprises positioning a transparent substrate on the surface of the already cured third polymer liquid and replicating a plurality of lenses on the transparent substrate.

In the present method the step of contacting the wafer substrate with the spacer substrate is preferably carried such that the first polymer liquid is present between the spacer posts and the wafer substrate.

The step of contacting the wafer substrate with the spacer substrate is preferably carried such that the first polymer liquid does not cover the outer peripheral lens surfaces of the plurality of lens shapes.

According to a preferred embodiment the present method further comprises applying an additional structure onto the surface of the plurality of lens shapes of the wafer substrate, wherein the additional structure is chosen from the group of aperture, diaphragm and filter, before applying the first polymer liquid and/or the second polymer liquid.

The step of applying the additional structure layer is preferably carried out by a coating step, a step of screen printing, ink jet printing or a step of 3 D printing.

The present method further comprises a step of singulating the assembly of spacer substrate and cured polymer liquids into single or plural lens carrier systems.

The curing of any polymer liquid is carried out by irradiating with UV and/or by thermal exposure, dependent on the type of polymer used. In another embodiment chemically curing polymers, so called two component systems, are preferred.

The present method further relates to a wafer level optical integral lens support, comprising:
a support, having at least one through hole and
at least one lens, made from a cured second polymer, each located within each through hole and embedded therein, wherein base parts of said outer ends of said support are covered by said cured second polymer and outer ends of said support are covered by a cured first polymer such that said outer ends are surrounded by said cured first polymer.

The range of index (n) and Abbe properties of the first cured polymer and the second cured polymer may be equal or different.

In the wafer level optical integral lens support according to the present invention the support is preferably made of a light-shielding material or a light-absorbing material. In addition, it is preferred that the first polymer also has a light-shielding or a light-absorbing function, for example with the aid of special fillers, pigments and dyes.

In a preferred embodiment of the present wafer level optical integral lens support at least one lens comprises an additional structure chosen from the group of aperture, diaphragm and filter.

The shape of at least one lens in the present wafer level optical integral lens support is preferably chosen from the group of flat, convex, concave, freeform optic, microfluidic, refractive, diffractive, micro lens array and Fresnel.

In the case of the application of two polymer liquids, such as a first polymer liquid and a second polymer liquid, surface mixing of the polymer liquids is not desirable. It is therefore preferred to cure the first polymer liquid before applying the second polymer liquid. In such an embodiment the first polymer liquid is in a somewhat cured state. It is also possible to carry out an initial cure of the first polymer liquid and to carry out a final curing step after the contacting step to obtain fully cured polymers. However, for using the capillary forces in an optimum way the polymer liquid must be able to flow in a somewhat "free fashion".

According to a preferred embodiment of the present method the step of contacting the wafer substrate with the spacer substrate is carried such that the plurality of locations between the lens shapes present on the wafer substrate are in alignment with the plurality of spacer posts present on the spacer substrate. This specific arrangement of both the lens shapes and the spacer posts enables a good formation of the first polymer around the outer ends of the spacer posts.

For obtaining an exact positioning in the XY+Z direction it is preferred that at least one of the wafer substrate and spacer substrate is provided with additional spacer members for contacting and positioning to a preset distance between wafer substrate and spacer substrate.

The present method further comprises singulating the assembly of lenses and spacer structure into single or plural lens carrier systems. Such a step can be carried out through dicing, or even punching, e.g. round fixtures.

The side walls of the spacer posts preferably have a parabolic shape, especially the side walls of the spacer posts are provided with a reflective layer, antireflective layer and/or antireflective structure.

The polymers are preferably chosen from the group of UV curable polymers, preferably epoxy, acrylic and nylon type polymers. The polymer material for the first polymer liquid can be different from the polymer material for the second polymer liquid and the third polymer. Examples are Huntsman Araldite CW 5730N/Aradur HY 573, Huntsman Araldite CW 5742/Aradur HY 5726, Micro resist Ormo-Comp, Asahi Kasei World Rock 5500 series, and Masterbond UV15LV.

According to the present method very thin lens structures, i.e. a thickness even down to 50 micron, can be manufactured. In addition, it is also possible to be integrated within this thin structure filters and diaphragms. Moreover, plural lens layers with different optical properties can be integrated within this thin structure. In addition, the thin lens manufactured according to the present method is embedded in thicker structure resulting in a robust construction. And the surrounding spacer obtained from the third polymer can also be used as a fixture for drop-in in optical assemblies.

It is preferred that at least one lens comprises a first cured polymer and a second cured polymer, wherein the range of index (n) and Abbe properties of the first cured polymer and a second cured polymer are different, especially that the support is made of a light-shielding material or a light-absorbing material.

In a preferred embodiment of a wafer level optical integral lens the at least one lens comprises an additional structure chosen from the group of aperture, diaphragm and filter.

The shape of the at least one lens in the present wafer level optical integral lens support is preferably chosen from the group of flat, convex, concave, freeform optic, microfluidic, refractive, diffractive, micro lens array and Fresnel.

In order to make the aforementioned and other features and advantages of the invention more comprehensible, several embodiments accompanied with drawings are described in detail below. The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENT

Figure 1:
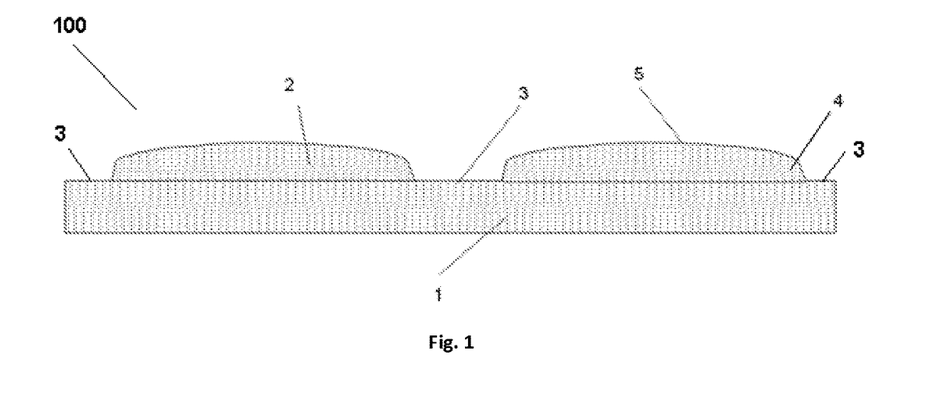
FIG. 1 shows an embodiment of the present method.

FIG. 1 shows a schematic front view of a wafer 100 comprising a wafer support 1 provided with a plurality of lens shapes 2, 4 on one side thereof. Lens shapes 2, 4 can posses any shape. Between lens shapes 2, 4 there are locations 3 on the surface the wafer support 1. The outer surface 5 of lens shapes 2, 4 can be provided with a structure. From legibility perspective wafer support 1 only possesses two lens shapes 2, 4. It is clear that the number of lens shapes on wafer support 1 is not limited. This holds also for the specific dimension and shape of lens shapes 2,4. The lens shapes present on wafer support can be different from lens shape to lens shape. This means that the shape of the lens shapes present on wafer support does not have to be same for all lens shapes. It is clear that the lens shapes present on wafer support 1 serve as a kind of a mould for the second liquid polymer (see FIG. 4).

Figure 2:
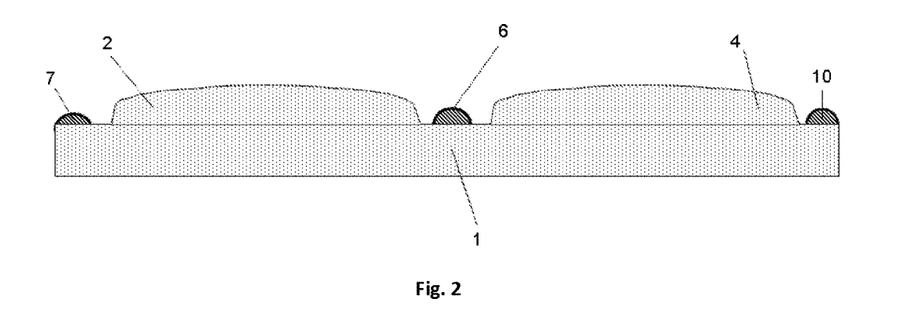
FIG. 2 shows another embodiment of the preset method.

FIG. 2 shows a first step of the present method of fabricating a wafer level optical lens assembly, wherein a first polymer liquid 6, 7, 10 is applied onto the locations 3 on the surface the wafer support 1, which is between lens shapes 2, 4. Since FIG. 2 is a front view of a wafer 100 comprising a wafer support 1 provided with a plurality of lens shapes 2, 4 on one side thereof, one will understand that first polymer liquid 6, 7, 10 will surround each lens shape 2, 4. First polymer liquid 6, 7, 10 can be applied as an array of individual dots of polymer liquid surrounding the lens shape. According to another embodiment first polymer liquid 6, 7, 10 is applied as a continuous line of polymer liquid. According to another embodiment first polymer liquid 6, 7, 10 is applied through a tampon process wherein an imprint or a punch is brought into contact with polymer liquid and the thus wetted imprint or a punch is transferred to the wafer support for depositing the polymer liquid onto the surface of the wafer support at the desired locations.

Figure 3:
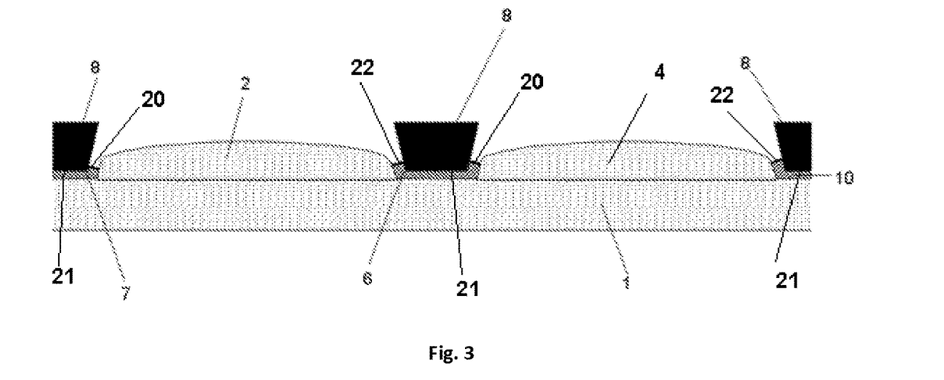
FIG. 3 shows an embodiment of the present method.

FIG. 3 shows a further step of the present method of fabricating a wafer level optical lens assembly, wherein a spacer substrate having a plurality of spacer posts or supports 8 is brought into contact with the wafer 100. The step of contacting the wafer substrate 100 with the spacer substrate having a plurality of spacer posts 8 results in forcing the first polymer liquid 6, 7, 10 to flow towards the plurality of lens shapes 2, 4 arranged side by side. In fact the first polymer liquid 6, 7, 10 will fill the location 3 between the lens shapes 2, 4. Although FIG. 3 shows no interconnecting structure between spacer posts, it is clear that spacer posts 8 are present on a spacer substrate. In a preferred embodiment spacer posts 8 are present on a common, i.e. a joint, spacer substrate. The distance between the contact surface 21 of the spacer posts 8 and the wafer support 1 is such that the area located between the contact surface of the spacer posts and the wafer support is filled with first polymer liquid 6, 7, 10. The first polymer liquid will be trapped in the slit thus created between the first contact surface 21 of the spacer posts and the wafer support, under capillary forces, and these capillary forces will force the polymer liquid to adapt a desired shape of the radii 20, 22 at its both ends, that is the position between the lens shapes 2, 4 and the spacer posts 8. Since FIG. 3 is a front view of a wafer 100 comprising a wafer support 1 provided with a plurality of lens shapes 2, 4 on one side thereof, one will understand that first polymer liquid 6, 7, 10 will surround each lens shape 2, 4, and thus the contact surface 21 of the spacer posts 8. Spacer posts 8 will preferably have a shape that is quite similar to the shape of lens shapes 2,4. If, for example, lens shape 2, 4 is circular, spacer posts 8 will preferably have a circular shape as well. However, the radius of the circular positioned spacer post 8 will be larger than the radius of lens shape 2,4 since spacer post 8 must contact the wafer substrate 100 at locations 3, which locations 3 are located between lens shapes 2, 4 present on wafer support 1. According to another embodiment if lens shape 2, 4 is circular, spacer posts 8 can be of rectangular shape. Consequently, first polymer liquid will have a rectangular outer dimension and a circular inner dimension as well. From FIG. 2-3 it is clear that for lens shape 2 the distance between a "left" spacer post 8 and the "right" spacer post 8 (in FIG. 3 this is the middle spacer post of a total of three spacer posts shown) is larger than the width of lens shape 2 itself. The area formed by the gap between the spacer posts 8 and the outer circumference of lens shape 2, 4 will be filled with first polymer liquid, and the slit created between the outer contact surface of spacer post 8 and the surface of wafer support 1 is also filled with first polymer liquid 6, 7, 10. The first polymer liquid 6, 7, 10 is subsequently cured by UV and/or by thermal exposure. It is also possible to apply the first polymer liquid 6, 7, 10 onto the outer ends 21 of the spacer posts 8 only and then contact the wafer substrate with the spacer substrate. According to another embodiment it is possible to apply first polymer liquid on both the locations 3 on the surface the wafer support 1 that is between lens shapes 2, 4 and on the outer ends 21 of the spacer posts 8. From FIG. 3 it is clear that the first polymer liquid only surrounds the outer end or end part of support 8, whereas the base part of support 8 is still uncovered. And the coverage of the base part of support 8 will be discussed in, inter alia, FIG. 4.

Figure 4:
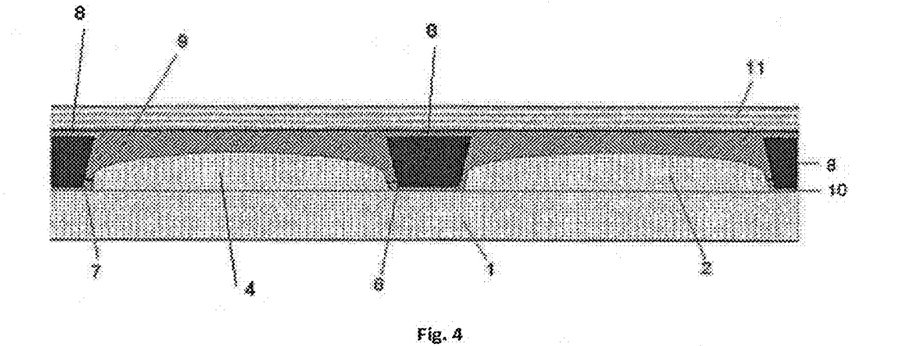
FIG. 4 shows another embodiment of the preset method.

FIG. 4 shows a further step of the present method of fabricating a wafer level optical lens assembly, wherein a second polymer liquid 9 is applied onto the plurality of lens shapes of the wafer support 1. The second liquid polymer will fill the area between the spacer posts, the already cured first polymer and the lens shapes. In certain embodiments the amount of second liquid polymer is such that the height formed by the second liquid polymer is higher than the height of the spacer posts. It is also possible to apply a less amount of second polymer liquid resulting in a level or height of second polymer being lower than the height of the spacer posts. In FIG. 4 there is also shown a flat substrate 11, for example a glass plate, for leveling the second polymer. The second polymer liquid is subsequently cured by UV and/or by thermal exposure and the second polymer thus cured has now a lens function. From FIG. 4 it is clear that support 8, i.e. its base part thereof, is covered by second polymer liquid. This second polymer liquid has a lens function, whereas the first polymer liquid has another function, i.e. a light-shielding or a light-absorbing function, preferably with the aid of special fillers, pigments and dyes. Thus, in support 8, comprising a base part and an outer end, the base part is covered by the cured second polymer and the outer end by the cured first polymer.

Figure 5:
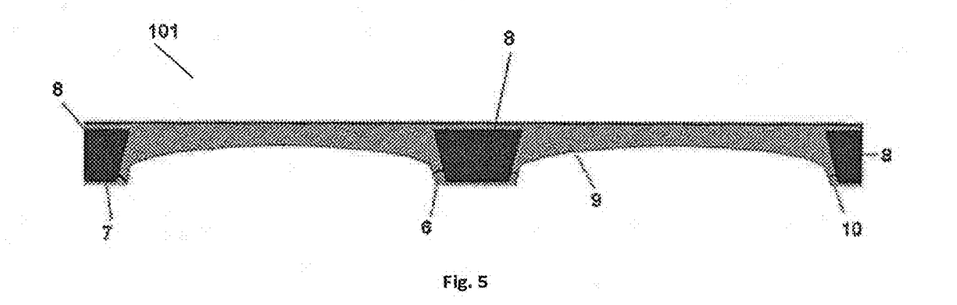
FIG. 5 shows an embodiment of the present method.

FIG. 5 shows the assembly 101 of spacer substrate and cured polymer liquids. One can see that the first polymer is located on the outer ends of the spacer posts. The outer ends of the spacer posts are covered or embedded by the first polymer. The first polymer does preferably not cover the optical surface of the lenses formed by second polymer.

Figure 6:
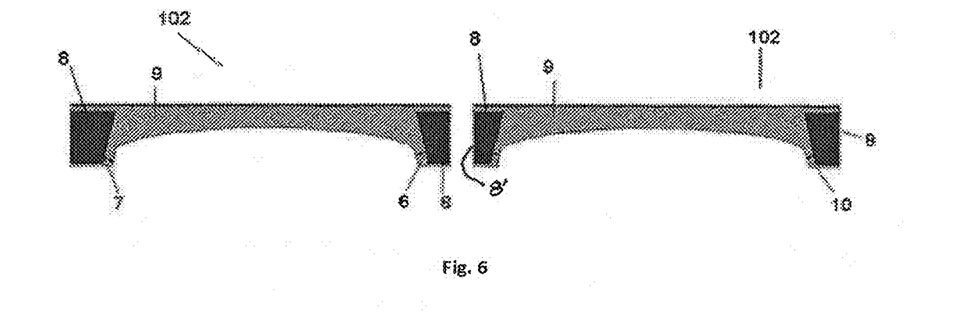
FIG. 6 shows another embodiment of the preset method.

FIG. 6 shows single or plural lens carrier systems 102 obtained after singulating the assembly 101 of spacer substrate and cured polymer liquids as shown in FIG. 5. Wafer level optical integral lens support 102, comprises a support 8 having at least one through hole 8' and at least one lens 9, made from a cured second polymer, each located within each through hole and embedded therein, wherein in this embodiment the thickness of each lens 9 being less than a thickness of the support 8, wherein the outer ends of the support are covered by a cured first polymer 6, 7, 10. From FIG. 6 one can see that the support comprises a base part and an outer part, wherein the base part is in contact with the cured second polymer and the end part of the support 8 is in contact with the cured first polymer. The cured first polymer is located such that the outer ends of the support 8 are surrounded by said cured first polymer. Thus, the outer ends are not covered by the cured second polymer. For light shielding purposes it is preferred to use a first polymer having a light-shielding or a light-absorbing function, preferably with the aid of special fillers, pigments and dyes. In addition, support 8 has a light-shielding or a light-absorbing function.

Figure 7:
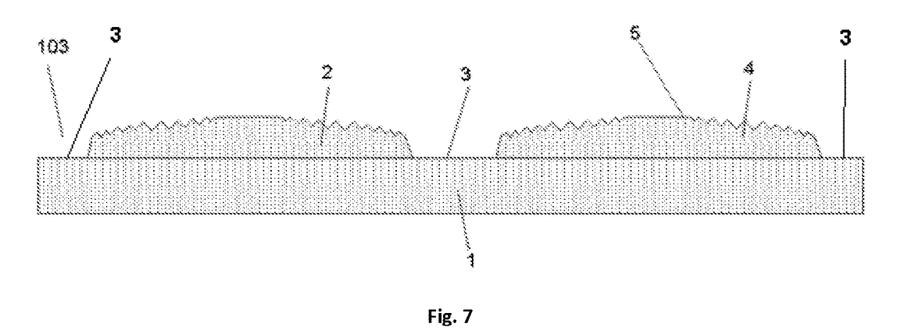
FIG. 7 shows an embodiment of the present method.

FIG. 7 shows another embodiment of a wafer 103 comprising a wafer support 1 provided with a plurality of lens shapes 2, 4 on one side thereof. Lens shapes 2, 4 can posses any shape. Between lens shapes 2, 4 there are locations 3 on the surface the wafer support 1. The outer surface 5 of lens shapes 2, 4 can be provided with a structure.

Figure 8:
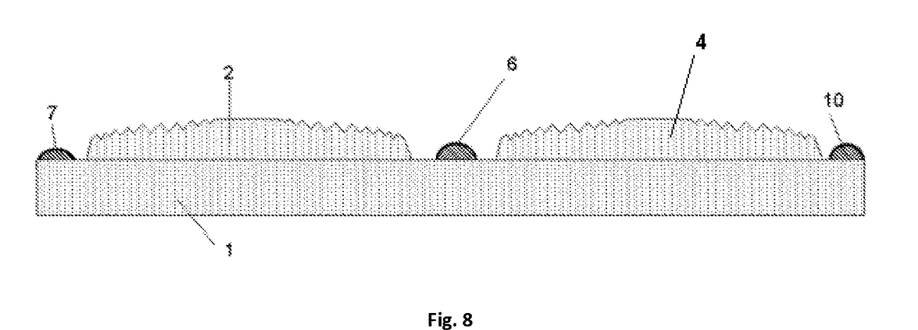
FIG. 8 shows another embodiment of the preset method.

FIG. 8 shows a first step of the present method of fabricating a wafer level optical lens assembly, wherein a first polymer liquid 6, 7, 10 is applied onto the locations 3 on the surface the wafer support 1, which is between lens shapes 2, 4.

Figure 9:
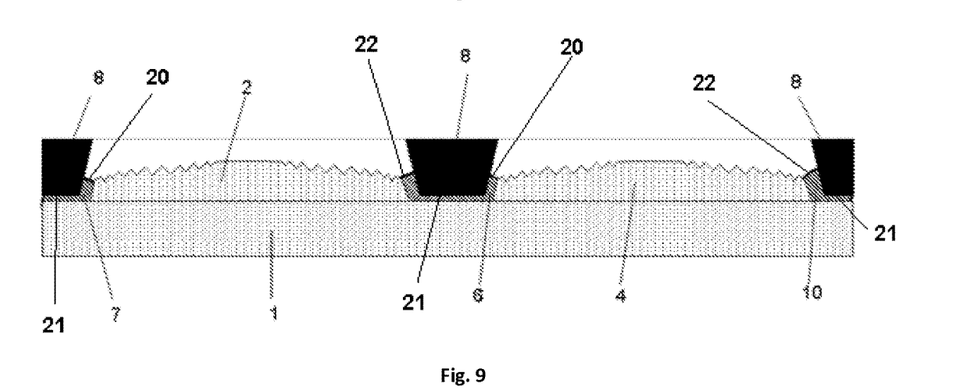
FIG. 9 shows an embodiment of the present method.

FIG. 9 is somewhat similar to the afore-mentioned FIG. 3 and shows the situation wherein a spacer substrate having a plurality of spacer posts 8 is brought into contact with wafer support 1 provided with a plurality of lens shapes 2, 4 on one side thereof. The distance between the contact surface of the spacer posts and the wafer support is such that the area located between the contact surface of the spacer posts and the wafer support is filled with first polymer liquid 6, 7, 10. The first polymer liquid will be trapped in the slit thus created between the first contact surface 21 of the spacer posts 8 and the wafer support 1, under capillary forces, and these capillary forces will force the polymer liquid to adapt a desired shape of the radii 20, 22 at its both ends, that is the position between the lens shapes 2, 4 and the spacer posts. It is also possible to apply the first polymer liquid 6, 7, 10 onto the outer ends of the spacer posts only and then contact the wafer substrate with the spacer substrate. According to another embodiment it is possible to apply first polymer liquid on both the locations 3 on the surface the wafer support 1, which is between lens shapes 2, 4, and on the outer ends of the spacer posts. In all embodiments disclosed here first polymer liquid is subsequently cured by UV and/or by thermal exposure.

Figure 10:
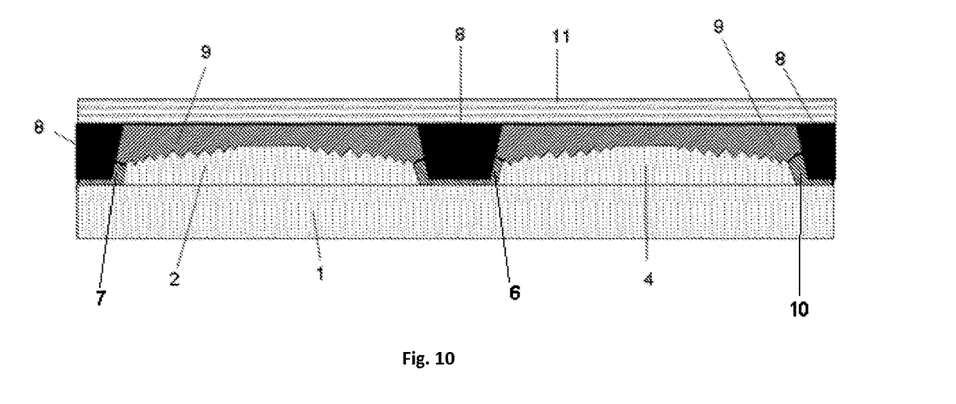
FIG. 10 shows another embodiment of the preset method.

FIG. 10 is somewhat similar to the afore-mentioned FIG. 4 and shows the situation wherein the second liquid polymer 9 is applied and subsequently leveled with the aid of a flat substrate 11. Second liquid polymer is subsequently cured by UV and/or by thermal exposure.

Figure 11:
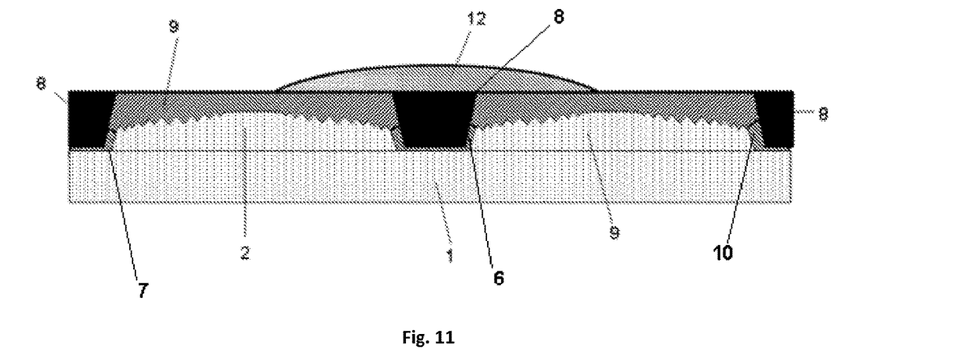
FIG. 11 shows an embodiment of the present method.
Figure 12:
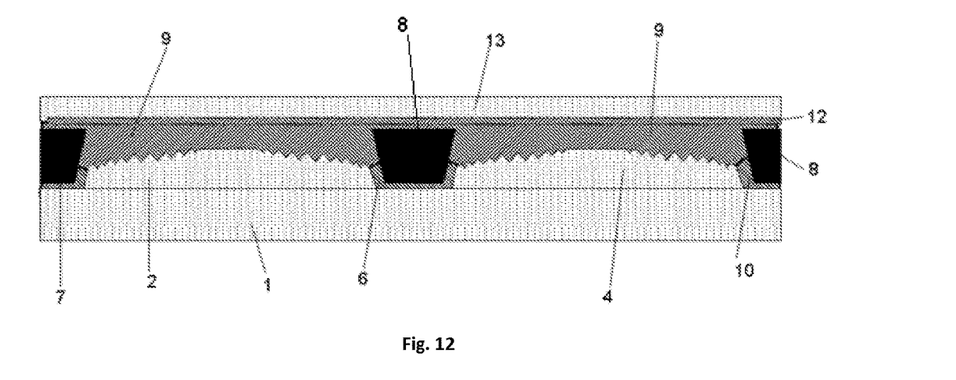
FIG. 12 shows another embodiment of the preset method.

FIG. 11 shows the application of a third liquid polymer 12 on top of the already cured second polymer 9. Such a third liquid polymer 12 can be leveled as well, with a flat substrate 13 for obtaining a flat surface, as shown in FIG. 12.

Figure 13:
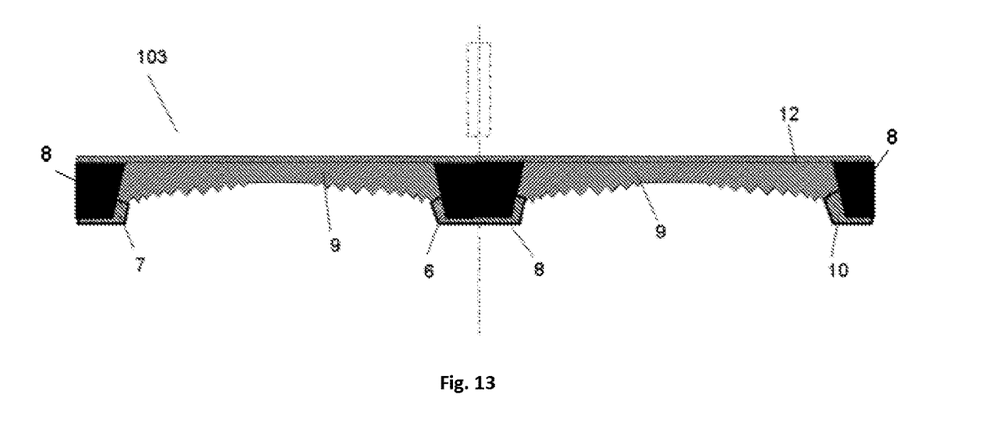
FIG. 13 shows an embodiment of the present method.

FIG. 13 shows the assembly 103 of spacer substrate and cured polymer liquids. One can see that the first polymer 6,7,10 is located on the outer ends of the spacer posts 8. The outer ends of the spacer posts 8 are covered or embedded by the first polymer 6,7,10. The first polymer 6,7,10 does preferably not cover the optical surface of the lenses formed by second polymer.

Figure 14:
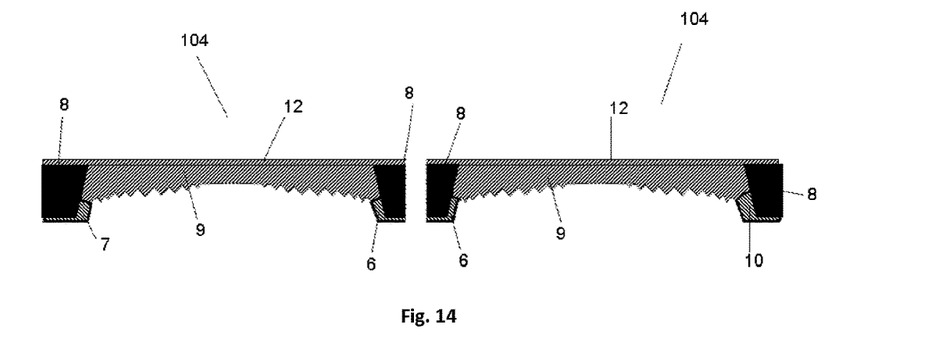
FIG. 14 shows another embodiment of the preset method.

FIG. 14 shows single or plural lens carrier systems 104 obtained after singulating the assembly 103 of spacer substrate and cured polymer liquids as shown in FIG. 13. Wafer level optical integral lens support 104, comprises a support 8 having at least one through hole and at least one lens 9, made from a cured second polymer, each located within each through hole and embedded therein, wherein in this embodiment the thickness of each lens 9 being less than a thickness of the support 8, wherein the outer ends of the support are covered by a cured first polymer 6, 7, 10. From FIG. 14 one can see that support 8 comprises a base part and an outer part, wherein the base part is in contact with the cured second polymer and the end part of the support 8 is in contact with the cured first polymer. The cured first polymer is located such that the outer ends of the support 8 are surrounded by said cured first polymer. Thus, the outer ends of the support 8 are not covered by the cured second polymer. For light shielding purposes it is preferred to use a first polymer having a light-shielding or a light-absorbing function, preferably with the aid of special fillers, pigments and dyes. In addition, support 8 has a light-shielding or a light-absorbing function. The function of the cured second polymer is an optical function, i.e. a lens function, whereas the function of the first second polymer is different, namely the provision of integrated light blocking side walls. FIG. 14 also shows the third polymer having a flat surface and located on top of the second polymer, i.e. lens 9.

Figure 15:
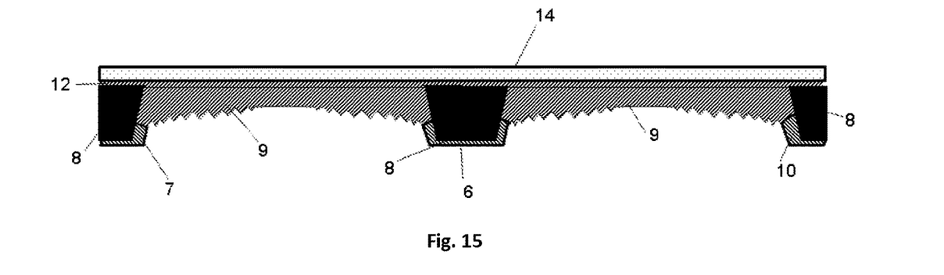
FIG. 15 shows an embodiment of the present method.

FIG. 15 shows another embodiment of the present assembly of spacer substrate and polymer liquids, wherein a glass substrate 14 is positioned on top of cured third polymer 12.

Figure 16:
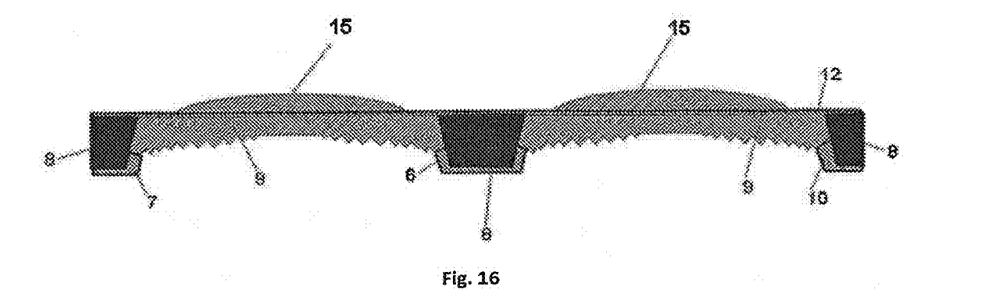
FIG. 16 shows another embodiment of the present method.

FIG. 16 shows another embodiment of the present assembly of spacer substrate and polymer liquids, wherein a replicated lens 15 is present on top of cured third polymer 12.

Figure 17:
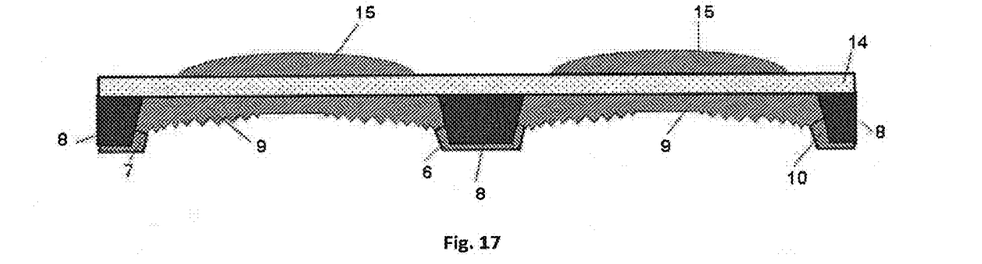
FIG. 17 shows another embodiment of the present method.

FIG. 17 shows another embodiment of the present assembly of spacer substrate and polymer liquids, wherein a glass substrate 14 is positioned on top of cured second polymer 9. In addition, a replicated lens 15 is present on top of cured second polymer 9.

Figure 18:
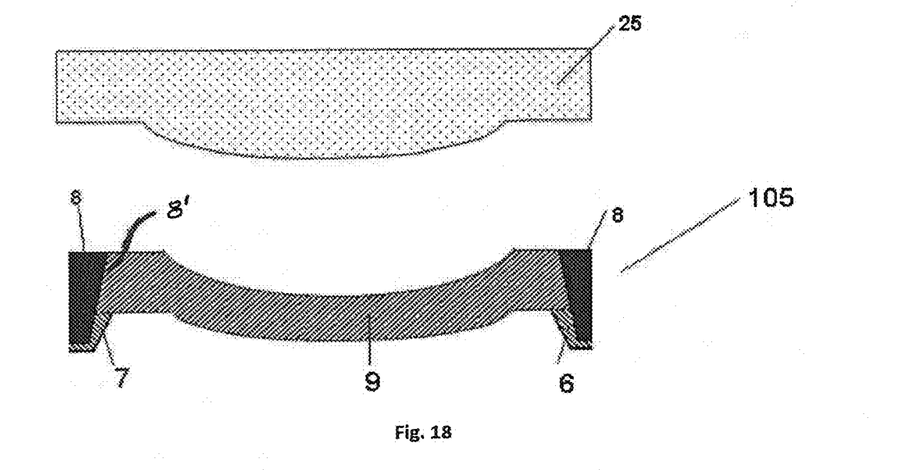
FIG. 18 shows an embodiment of the present method.

FIG. 18 shows another embodiment of the wafer level optical integral lens support 105 comprising a support 8, having at least one through hole 8' and a concavo convex lens 9, made from a cured second polymer, located within the through hole and embedded therein. The outer ends of spacer posts 8 are provided with cured first polymer 6, 7. The specific shape of lens 9 is obtained by using a mould 25. From FIG. 18 one can see that support 8 comprises a base part and an outer part, wherein the base part is in contact with the cured second polymer and the end part of the support 8 is in contact with the cured first polymer. The cured first polymer is located such that the outer ends of the support 8 are surrounded by said cured first polymer. Thus, the outer ends of the support 8 are not covered by the cured second polymer. For light shielding purposes it is preferred to use a first polymer having a light-shielding or a light-absorbing function, preferably with the aid of special fillers, pigments and dyes. In addition, support 8 has a light-shielding or a light-absorbing function. The function of the cured second polymer is an optical function, i.e. a lens function, whereas the function of the first second polymer is different, namely the provision of integrated light blocking side walls.

Figure 19:
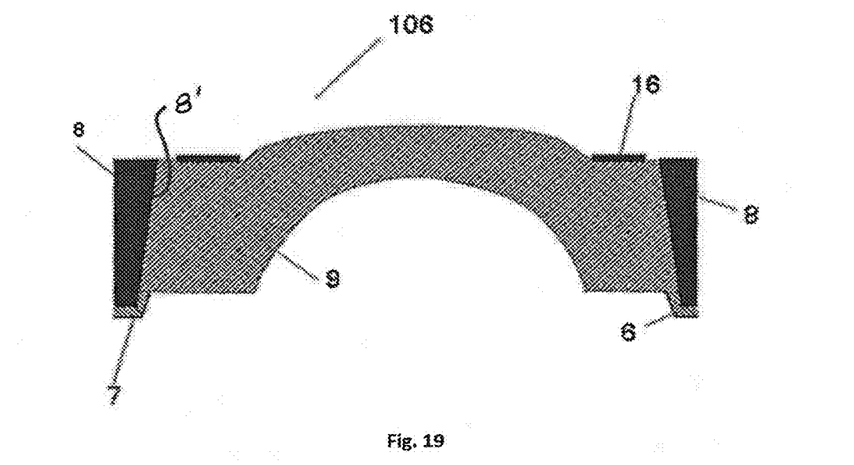
FIG. 19 shows another embodiment of the present method.

FIG. 19 shows another embodiment of the wafer level optical integral lens support 106 comprising a support 8, having at least one through hole 8' and a concavo convex lens 9, made from a cured second polymer, located within the through hole and embedded therein. The outer ends of spacer posts 8 are provided with cured first polymer 6, 7. An integrated structure 16 is a diaphragm. From FIG. 19 one can see that support 8 comprises a base part and an outer part, wherein the base part is in contact with the cured second polymer and the end part of the support 8 is in contact with the cured first polymer. The cured first polymer is located such that the outer ends of the support 8 are surrounded by said cured first polymer. Thus, the outer ends of the support 8 are not covered by the cured second polymer. For light shielding purposes it is preferred to use a first polymer having a light-shielding or a light-absorbing function, preferably with the aid of special fillers, pigments and dyes. In addition, support 8 has a light-shielding or a light-absorbing function. The function of the cured second polymer is an optical function, i.e. a lens function, whereas the function of the first second polymer is different, namely the provision of integrated light blocking side walls.

Figure 20:
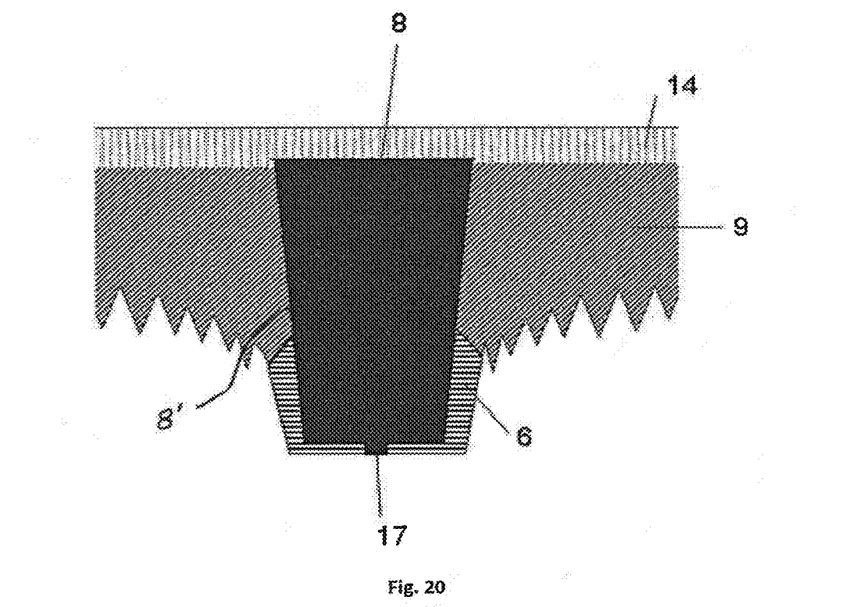
FIG. 20 shows another embodiment of the present method.
Figure 21:
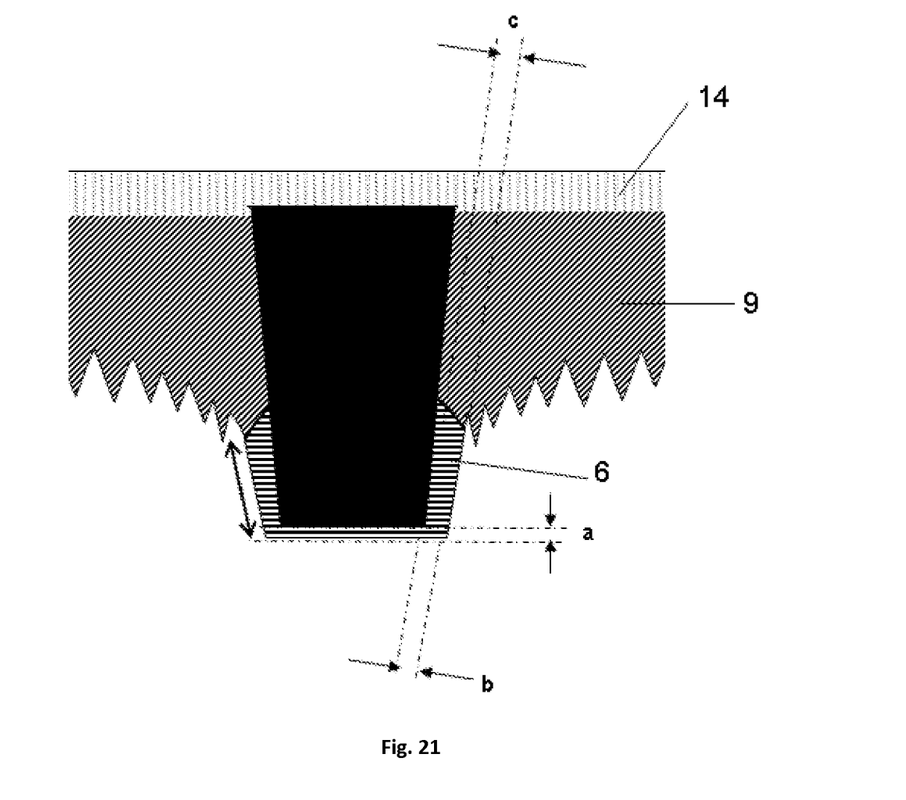
FIG. 21 shows another embodiment of the present method.

FIGS. 20 and 21 show a detailed view of a spacer post or support 8, provided with cured first polymer 6. The outer end of spacer post or support 8 is completely embedded by or covered with cured first polymer 6. Due to the narrow slit between the outer ends of spacer post or support 8 and the locations 3 on the surface the wafer support 1, between lens shapes 2, 4 (see FIG. 3 for example), the capillary forces will force the first polymer to flow towards the outer peripheral lens surfaces of the plurality of lenses. The thickness of slit a is preferably less than the thickness of b. In certain embodiments the thickness of b is preferably less than the thickness of c. Spacer post 8 has a protruding structure 17 ensuring a correct height of the slit between the outer ends of spacer posts 8 and the surface of wafer support 1.

The invention claimed is:

1. A method of fabricating a wafer level optical lens assembly, comprising:
providing a wafer substrate having a plurality of lens shapes arranged side by side;
providing a spacer substrate having a plurality of spacer posts;
applying a first polymer liquid on a specific location chosen from the group of: (1) positions located on said wafer substrate between said plurality of lens shapes; (2) positions located on the contact surface of said spacer posts;

contacting said wafer substrate with said spacer substrate such that said spacer posts force said first polymer liquid to flow towards said plurality of lens shapes arranged side by side;

curing said first polymer liquid;

applying a second polymer liquid onto said plurality of lens shapes of said wafer substrate;

curing said second polymer liquid to form a lens.

2. A method according to claim 1, wherein said spacer substrate is made of a light-shielding material or a light-absorbing material.

3. A method according to claim 1, wherein said first polymer has a light-shielding or a light-absorbing function, preferably with the aid of special fillers, pigments and dyes.

4. A method according to claim 3, further comprising leveling said third polymer liquid before curing said third polymer liquid.

5. A method according to claim 1, further comprising applying a third polymer liquid onto said already cured second polymer liquid and curing said third polymer liquid.

6. A method according to claim 5, further comprising replicating a plurality of lenses on the surface of said already cured third polymer liquid.

7. A method according to claim 6, further comprising positioning a transparent substrate on the surface of said already cured third polymer liquid and replicating a plurality of lenses on said transparent substrate.

8. A method according to claim 1, wherein said step of contacting said wafer substrate with said spacer substrate is carried such that said first polymer liquid is present between said spacer posts and said wafer substrate.

9. A method according to claim 1, wherein said step of contacting said wafer substrate with said spacer substrate is carried such that said first polymer liquid does not cover the outer peripheral lens surfaces of said plurality of lens shapes arranged side by side.

10. A method according to claim 1, wherein said step of contacting said wafer substrate with said spacer substrate is carried such that said first polymer liquid wets the contact surface of the spacer posts for surrounding or embedding the outer ends of the spacer posts with said first polymer liquid.

11. A method according to claim 1, further comprising applying an additional structure onto the surface of the plurality of lens shapes of said wafer substrate, wherein said additional structure is chosen from the group of aperture, diaphragm and filter, before applying said first polymer liquid and/or said second polymer liquid.

12. A method according to claim 11, wherein the step of applying said additional structure layer is carried out by a coating step, a step of screen printing, ink jet printing or a step of 3 D printing.

13. A method according to claim 1, further comprising singulating the assembly of spacer substrate and cured polymer liquids into single or plural lens carrier systems.

14. A method according to claim 1, wherein said curing is carried out by irradiating with UV and/or by thermal exposure.

15. A wafer level optical integral lens support, comprising:

a support, having at least one through hole and at least one lens, made from a cured second polymer, each located within each through hole and embedded therein, wherein base parts of said outer ends of said support are covered by said cured second polymer and outer ends of said support are covered by a cured first polymer such that said outer ends are surrounded by said cured first polymer, said cured second polymer directly contacts said cured first polymer, the shape of said cured first polymer results from capillary action.

16. A wafer level optical integral lens support according to claim 15, wherein the range of index (n) and Abbe properties of said first cured polymer and said second cured polymer are different.

17. A wafer level optical integral lens support according to claim 15, wherein said support is made of one of a light-shielding material and a light-absorbing material.

18. A wafer level optical integral lens support according to claim 15, wherein said first polymer has a light-shielding or a light-absorbing function, preferably with the aid of special fillers, pigments and dyes.

19. A wafer level optical integral lens support according to claim 15, wherein said at least one lens comprises an additional structure chosen from the group of aperture, diaphragm and filter.

20. A wafer level optical integral lens support according to claim 15, wherein the shape of said at least one lens is chosen from the group of flat, convex, concave, freeform optic, microfluidic, refractive, diffractive, micro lens array and Fresnel.

\* \* \* \* \*